Dec. 27, 1949  S. J. ROBINS  2,492,369
DOUBLE-ACTION GAUGE
Filed Nov. 14, 1945
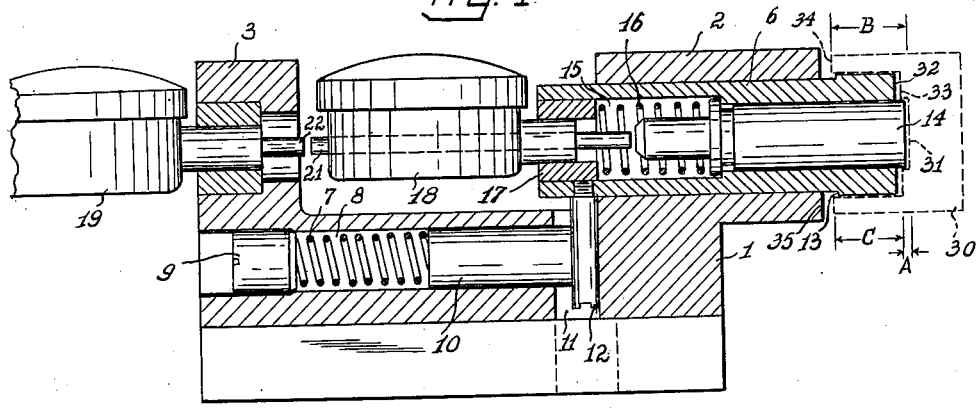
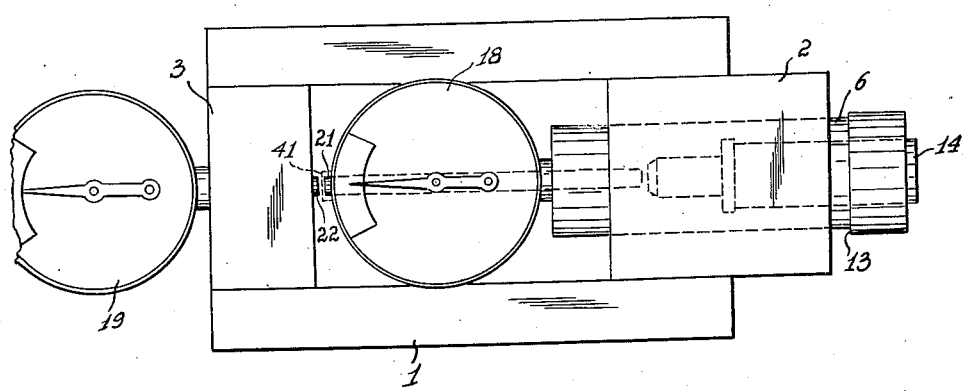
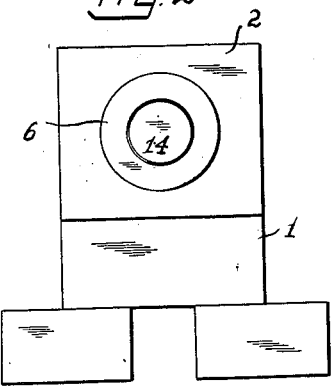
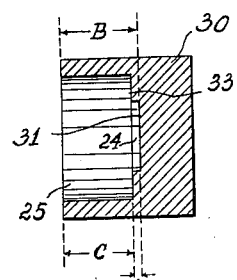
INVENTOR.
Stanley J. Robins
BY
Michaelis & Michaelis Patented Dec. 27, 1949

2,492,369

UNITED STATES PATENT OFFICE 2,492,369

DOUBLE-ACTION GAUGE

Stanley J. Robins, New York, N. Y.

Application November 14, 1945, Serial No. 628,399

1 Claim. (Cl. 33—174)

This invention relates to gauges and more especially to devices for testing longitudinal dimensions of workpieces.

It is an object of this invention to provide a device of the kind aforesaid which is organized to test two dimensions of a workpiece on correct length in one and the same operation.

I will now describe more in detail the nature of this invention and the best manner in which it can be performed, having reference to the drawings annexed to this specification and forming part thereof, in which an embodiment of the invention is illustrated diagrammatically by way of example.

In the drawings
Fig. 1 is an axial section, while
Fig. 2 is an end view.
Fig. 3 is a plan view and
Fig. 4 is a section of a workpiece to be tested.

Referring to the drawings, 1 is a block or body and 2 and 3 are two bearings aligned coaxially in spaced relation on the ends of said block.

6 is a sleeve mounted in bearing 2 for axial displacement, like a tubular plunger, relative to the body 1 against the action of a return spring 7 held in another bore 8 of the body between a stopper 9 and a piston 10 projecting from the bore 8 into a cavity 11 of the body and abutting against a driver 12 which extends vertically into said cavity and is fixed to the sleeve 6 by its top end. The outwardly projecting end of sleeve 6 is formed with a collar 13 limiting its inward movement.

14 is a plunger axially displaceable in the bore 15 of sleeve 6 against the action of a return spring 16 abutting against a perforated stopper 17, in which is mounted a dial indicator gauge 18 which is thus fixed to and forms part of the sleeve 6. Another dial indicator gauge 19 is arranged in alignment with gauge 18 in the bearing 3 and is thus held immovably in the body 1. 21 is the spindle of gauge 18; it extends through diametrically opposed holes in the dial casing and its farther end (on the left in the drawing) is spaced a predetermined distance from the end of the spindle 22 of the other gauge 19. The other end of spindle 21 is spaced a predetermined distance from the inner end of the plunger 14.

With the parts arranged as above described, it is clear that pressure exerted in axial direction on the plunger 14 will cause its inner end to contact, and exert pressure on, the spindle 21 of the dial indicator gauge 18 which is fixed to the tubular plunger or sleeve 6. When spindle 21 is thus forced toward the left in the drawing, the hand on the dial of gauge 18 will be deflected. If now pressure in axial direction is exerted also on the tubular plunger 6, without the pressure on plunger 14 being released, the gauge 18 will be moved bodily towards the left in the drawing and the free end of its spindle 21 will contact, and exert pressure on, the spindle 22 of the gauge 19 which is immovably fixed in the block 1. This spindle, on being shifted axially relative to the gauge body, will cause the hand on the dial of this gauge to be deflected. Thus pressure exerted consecutively on the projecting ends of plunger 14 and tubular plunger 6 will cause consecutive deflection of the hands of both gauges.

As shown in dotted lines in Fig. 1, a work piece 30 such as shown in Fig. 4 can be tested by means of this device in a single operation as to correct axial dimension of the inner recess 24 and the outer recess 25 and their total depth B. When a workpiece 30 is placed on the projecting end of the tubular plunger 6 and forced by hand toward the left in the drawing, its bottom 31 after contacting the plunger 14 will shift it towards the spindle 21 of the first gauge 18 and cause deflection of its hand. The movement of the workpiece is limited by the end face 32 of the tubular plunger 6 when the annular bottom face 33 of the workpiece contacts the end face 32. The deflection of the hand of gauge 18 will indicate whether the depth A of the inner recess 24 is correct. Continuing pressure on the workpiece will then cause the annular bottom face 33 to force the tubular plunger 6 toward the left in the drawing, whereby the gauge 18 and its spindle 21 are shifted towards spindle 22 of gauge 19, until the annular top face 34 of the workpiece meets the end face 35 of the block 1. Deflection of the hand of gauge 19 shows whether total depth B is correct.

Instead of measuring the dimension B, I may also measure the dimension C (Fig. 4) by fixing a cap 41 (Fig. 3) to the gauge body 18 facing the end of spindle 22 of gauge 19. This cap is not influenced by the spindle 21. When the gauge body 18 is displaced together with the sleeve 6, the dial of gauge 19 will register the length C of this displacement relative to the instrument body 1, when the cap 41 contacts the spindle 22.

I wish it to be understood that I do not desire to be limited to the details of construction shown in the drawing and described in the specification, for obvious modifications will occur to a person skilled in the art.

I claim:

A gauge device comprising in combination, two dial indicator gauges mounted with their spindles in axial alignment, one of said gauges being supported for axial movement relative to the end of, and into contact with, the spindle of the other gauge, an axially movable tubular plunger supporting the movable gauge and another plunger being arranged for reciprocation within said tubular plunger in alignment with the spindle of the other gauge and in operative relation to the spindle of the movable gauge.

STANLEY J. ROBINS.

REFERENCES CITED

The following references are of record in the file of this patent:

UNITED STATES PATENTS

| Number | Name | Date |
|---|---|---|
| 1,579,900 | Trimbath | Apr. 6, 1926 |
| 2,081,738 | Cononer | May 25, 1937 |
| 2,202,638 | Praeg | May 28, 1940 |